(12) United States Patent
Cao et al.

(10) Patent No.: US 12,120,013 B2
(45) Date of Patent: Oct. 15, 2024

(54) TEST FRAME GENERATION

(71) Applicant: Alipay (Hangzhou) Information Technology Co., Ltd., Hangzhou (CN)

(72) Inventors: Hongjian Cao, Hangzhou (CN); Lin Huang, Hangzhou (CN); Yunding Jian, Hangzhou (CN); Wei Fu, Hangzhou (CN); Wanqiao Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/277,889

(22) PCT Filed: Feb. 17, 2022

(86) PCT No.: PCT/CN2022/076648
§ 371 (c)(1),
(2) Date: Aug. 18, 2023

(87) PCT Pub. No.: WO2022/174790
PCT Pub. Date: Aug. 25, 2022

(65) Prior Publication Data
US 2024/0187328 A1 Jun. 6, 2024

(30) Foreign Application Priority Data
Feb. 20, 2021 (CN) .......... 202110191668.9

(51) Int. Cl.
*G06F 15/173* (2006.01)
*H04L 43/022* (2022.01)
(Continued)

(52) U.S. Cl.
CPC .......... *H04L 43/50* (2013.01); *H04L 43/022* (2013.01); *H04L 43/0823* (2013.01)

(58) Field of Classification Search
CPC .... H04L 43/50; H04L 43/022; H04L 43/0823
See application file for complete search history.

(56) References Cited

U.S. PATENT DOCUMENTS 11,388,078 B1 * 7/2022 Sommers ............... H04L 43/50
2009/0204591 A1 8/2009 Kaksonen et al.
(Continued)

FOREIGN PATENT DOCUMENTS

CN 104507101 A 4/2015
CN 110474900 A 11/2019
(Continued)

OTHER PUBLICATIONS

The International Search Report and Written Opinion of the International Searching Authority for International Application No. PCT/CN2022/076648 mailed on Apr. 27, 2022.

*Primary Examiner* — Joseph R Maniwang
(74) *Attorney, Agent, or Firm* — Womble Bond Dickinson (US) LLP

(57) ABSTRACT

Embodiments of this specification provide a test frame generation method, apparatus, and device. The method includes: determining version information of a to-be-tested wireless communication protocol and type information of a to-be-generated test frame; determining a to-be-processed target field according to the version information and the type information; obtaining distortion data corresponding to the target field based on a predetermined distortion policy; and generating a test frame according to the obtained distortion data, where the test frame is used to test whether the wireless communication protocol is at risk.

18 Claims, 6 Drawing Sheets

(51) Int. Cl.
 *H04L 43/0823* (2022.01)
 *H04L 43/50* (2022.01)

(56) References Cited

U.S. PATENT DOCUMENTS

| | | | |
|---|---|---|---|
| 2013/0176889 A1* | 7/2013 | Ogawa | H04L 12/12 370/252 |
| 2017/0124333 A1 | 5/2017 | Shon et al. | |
| 2018/0095844 A1* | 4/2018 | Pappu | G06F 11/2268 |

FOREIGN PATENT DOCUMENTS

| | | |
|---|---|---|
| CN | 111176977 A | 5/2020 |
| CN | 112565026 A | 3/2021 |

\* cited by examiner

TEST FRAME GENERATION

TECHNICAL FIELD

This document relates to the field of wireless communication technologies, and in particular, to a test frame generation method, apparatus, and device.

BACKGROUND

With the rise of the Internet era, a Wi-Fi network has become an indispensable part of people's lives. Applications of the Wi-Fi network are also everywhere, such as enterprise operations and smart home. Data communication based on the Wi-Fi network mainly relies on the IEEE 802.11 protocol. However, due to security vulnerabilities in this protocol, users have been attacked, leading to incidents such as privacy leakage. Therefore, it is necessary to perform a security test on the IEEE 802.11 protocol. How to generate an effective test frame needed for performing the test is an important problem that needs to be solved urgently.

SUMMARY

One or more embodiments of this specification provide a test frame generation method. The method includes: determining version information of a to-be-tested wireless communication protocol and type information of a to-be-generated test frame, where the test frame is used to test whether the wireless communication protocol is at risk; determining a to-be-processed target field according to the version information and the type information; obtaining distortion data corresponding to the target field based on a predetermined distortion policy; and generating the test frame according to the distortion data.

One or more embodiments of this specification provide a test frame generation apparatus. The apparatus includes a first determining module, configured to determine version information of a to-be-tested wireless communication protocol and type information of a to-be-generated test frame, where the test frame is used to test whether the wireless communication protocol is at risk. The apparatus further includes a second determining module, configured to determine a to-be-processed target field according to the version information and the type information. The apparatus further includes an acquisition module, configured to obtain distortion data corresponding to the target field based on a predetermined distortion policy. The apparatus further includes a generation module, configured to generate the test frame according to the distortion data.

One or more embodiments of this specification provide a test frame generation device. The device includes a processor. The device further includes a memory arranged to store computer executable instructions. When the computer executable instructions are executed, the processor is caused to determine version information of a to-be-tested wireless communication protocol and type information of a to-be-generated test frame, where the test frame is used to test whether the wireless communication protocol is at risk; determine a to-be-processed target field according to the version information and the type information; obtain distortion data corresponding to the target field based on a predetermined distortion policy; and generate the test frame according to the distortion data.

One or more embodiments of this specification provide a storage medium. The storage medium is configured to store computer executable instructions. When the computer executable instructions are executed by a processor, the processor is caused to determine version information of a to-be-tested wireless communication protocol and type information of a to-be-generated test frame, where the test frame is used to test whether the wireless communication protocol is at risk; determine a to-be-processed target field according to the version information and the type information; obtain distortion data corresponding to the target field based on a predetermined distortion policy; and generate the test frame according to the distortion data.

BRIEF DESCRIPTION OF DRAWINGS

To describe the technical solutions in one or more embodiments of this specification or in the existing technology more clearly, the following briefly introduces the accompanying drawings for describing the embodiments or the existing technology. Clearly, the accompanying drawings in the following description merely show some embodiments of this specification, and a person of ordinary skill in the art can still derive other drawings from these accompanying drawings without creative efforts.

DESCRIPTION OF EMBODIMENTS

To make a person skilled in the art understand the technical solutions in one or more embodiments of this specification better, the following clearly and comprehensively describes the technical solutions in the one or more embodiments of this specification with reference to the accompanying drawings in the one or more embodiments of this specification. Clearly, the described embodiments are merely some but not all of the embodiments of this specification. All other embodiments obtained by a person of ordinary skill in the art based on the one or more embodiments of this specification without creative efforts shall fall within the protection scope of this specification.

Figure 1:
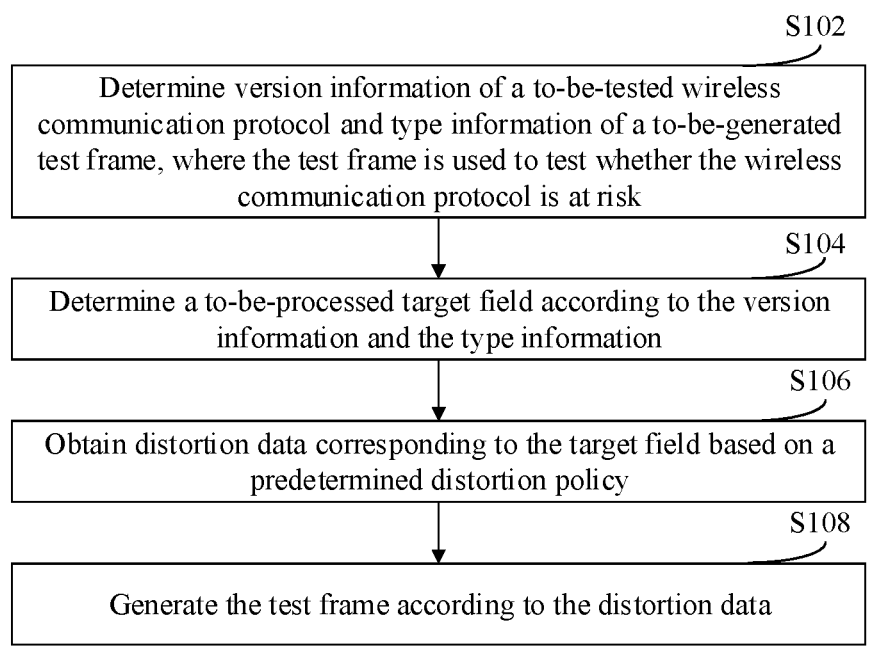
FIG. 1 is a first schematic flowchart illustrating a test frame generation method, according to one or more embodiments of this specification.

FIG. 1 is a schematic flowchart illustrating a test frame generation method, according to one or more embodiments of this specification. The method in FIG. 1 can be performed by a test frame generation apparatus. As shown in FIG. 1, the method includes the following steps: Step S102: Determine version information of a to-be-tested wireless communication protocol and type information of a to-be-generated test frame. The test frame is used to test whether the wireless communication protocol is at risk. With continuous development of wireless communication technologies, various wireless communication protocols are also generated, such as the Bluetooth protocol, the ZigBee protocol, and the IEEE 802.11 protocol. In this embodiment of this application, for example, the to-be-tested wireless communication protocol is the IEEE 802.11 protocol. For a manner of generating a test frame in another wireless communication protocol, refer to a manner of generating a test frame in the IEEE 802.11 protocol.

The IEEE 802.11 protocol defines three types of frames, including a management frame, a control frame, and a data frame. The management frame includes a frame head and a frame body, and the frame body includes a fixed field and an information element. The control frame includes a frame head. The data frame includes a frame head and a frame body, and the frame body is mainly data. With increasing requirements on a data transmission rate, a transmission distance, etc., the IEEE 802.11 protocol currently has multiple versions, such as IEEE 802.11a, IEEE 802.11b, and IEEE 802.11g. To perform an effective test on the to-be-tested wireless communication protocol subsequently, the test frame generation apparatus first determines the version information of the to-be-tested wireless communication protocol and the type information of the to-be-generated test frame. Optionally, when a user needs to perform test processing on the wireless communication protocol, the user operates the test frame generation apparatus, and sends a test frame generation request to the test frame generation apparatus. Or the user operates a management device connected to the test frame generation apparatus, and the management device sends a test frame generation request to the test frame generation apparatus in response to the user operation. Correspondingly, the test frame generation apparatus determines version information and type information carried in the received test frame generation request as the version information of the to-be-tested wireless communication protocol and the type information of the to-be-generated test frame. Or the version information of the to-be-tested wireless communication protocol and the type information of the to-be-generated test frame are predetermined in the test frame generation apparatus. Correspondingly, when determining that a test frame generation condition is satisfied, the test frame generation apparatus determines the predetermined version information and type information as the version information of the to-be-tested wireless communication protocol and the type information of the to-be-generated test frame. Determining that the test frame generation condition is met is, for example, receiving the test frame generation request sent by the user, which can be set according to a requirement in an actual application.

Step S104: Determine a to-be-processed target field according to the version information and the type information. Different versions of IEEE 802.11 stipulate different frame formats, and fields on which distortion processing can be performed in different types of frames are also different. Based on this, to generate an effective test frame, the corresponding to-be-processed target field is determined according to the version information of the to-be-tested wireless communication protocol and the type information of the to-be-generated test frame.

Step S106: Obtain distortion data corresponding to the target field based on a predetermined distortion policy. Step S108: Generate a test frame according to the distortion data.

In one or more embodiments of this specification, the to-be-processed target field is determined according to the version information of the to-be-tested wireless communication protocol and the type information of the to-be-generated test frame; the distortion data corresponding to the target field is obtained based on the predetermined distortion policy; and the test frame is generated according to the distortion data. Therefore, in consideration of both a version of a wireless communication protocol and a type of a frame, a test frame is generated based on a distortion policy, so the generated test frame is effective and more targeted, so accuracy of a test result of the to-be-tested wireless communication protocol can be improved, and a security vulnerability existing in the wireless communication protocol is discovered and patched in a timely manner, thereby avoiding a loss to the user.

Figure 2:
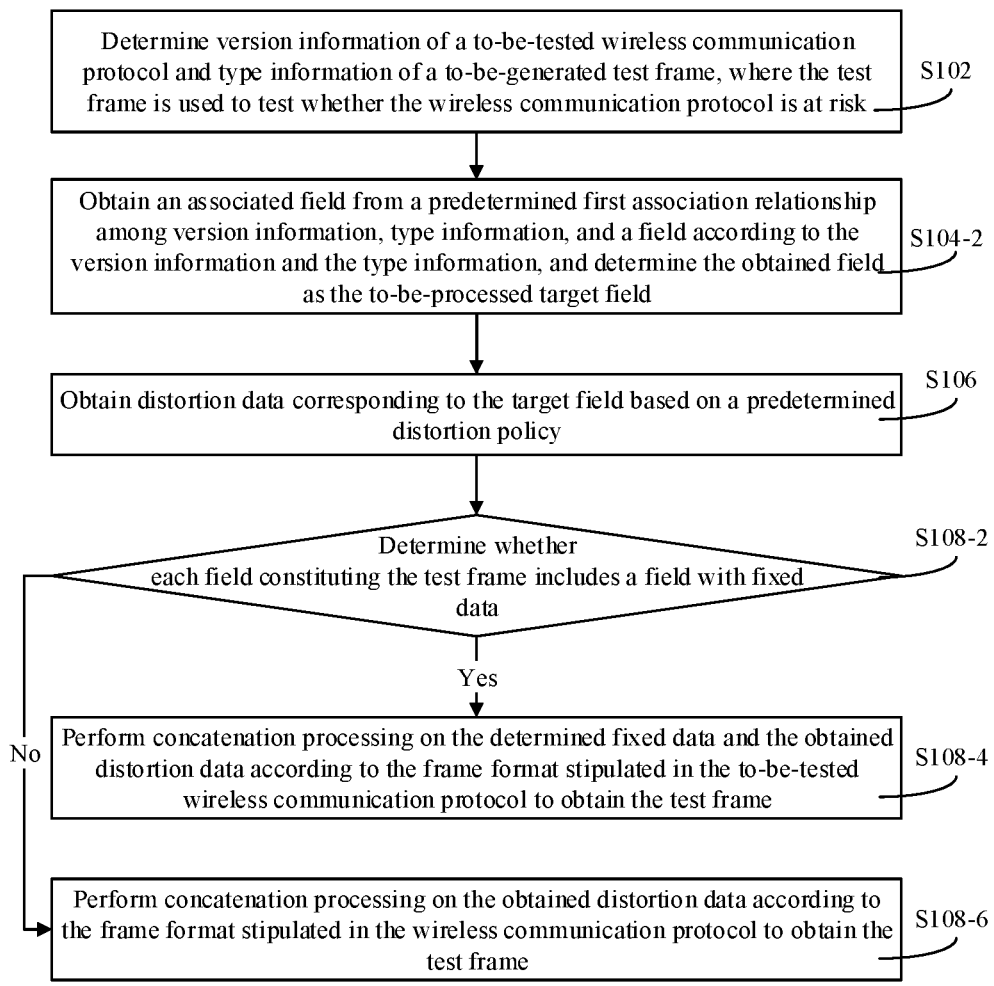
FIG. 2 is a second schematic flowchart illustrating a test frame generation method, according to one or more embodiments of this specification.

To ensure that the test frame generation apparatus can accurately determine the target field, in one or more embodiments of this application, a first association relationship among version information, type information, and a field is predetermined, and the target field is determined based on the first association relationship. Specifically, as shown in FIG. 2, step S104 can include the following step S104-2:

Step S104-2: Obtain an associated field from a predetermined first association relationship among version information, type information, and a field according to the version information and the type information, and determine the obtained field as the to-be-processed target field.

In consideration that some types of frames can further include fields that have fixed data and do not need to be processed, such as an element identifier field in an information element of a management frame, for different management frames, element identifiers of the same information element are fixed, such as 29. Based on this, corresponding to step S104-2, as shown in FIG. 2, step S108 can include the following step S108-2 to step S108-6: Step S108-2: Determine whether each field constituting the test frame includes a field with fixed data. Step S108-4 is performed if yes. Otherwise, step S108-6 is performed. Specifically, a third association relationship among version information, type information, and a field with fixed data can be predetermined. The test frame generation apparatus determines whether an associated field is obtained from the third association relationship according to the version information of the to-be-tested wireless communication protocol and the type information of the to-be-generated test frame; if yes, determines that each field constituting the test frame includes a field with fixed data; or if no, determines that each field constituting the test frame does not include a field with fixed data.

Step S108-4: Perform concatenation processing on the determined fixed data and the obtained distortion data according to a frame format stipulated in the to-be-tested wireless communication protocol, to obtain the test frame. Specifically, the fixed data corresponding to the field with fixed data can be obtained from the third association relationship. Or the associated fixed data are obtained from a predetermined fourth association relationship between a field and fixed data according to the field obtained from the third association relationship. Concatenation processing is performed on the obtained fixed data and distortion data according to the frame format stipulated in the to-be-tested wireless communication protocol to obtain the test frame.

As an example, the frame head of the management frame successively includes Frame control, Duration, Address1, Address2, and Address3 from left to right, and then concatenation processing is successively performed on data corresponding to each determined field in an order from left to right.

Step S108-6: Perform concatenation processing on the obtained distortion data according to the frame format stipulated in the wireless communication protocol to obtain the test frame.

Therefore, by presetting the previous first association relationship, the to-be-processed target field is determined based on the first association relationship, and concatenation processing is performed on fixed data or distortion data corresponding to each field constituting the test frame, thereby ensuring accuracy of the obtained test frame.

Figure 3:
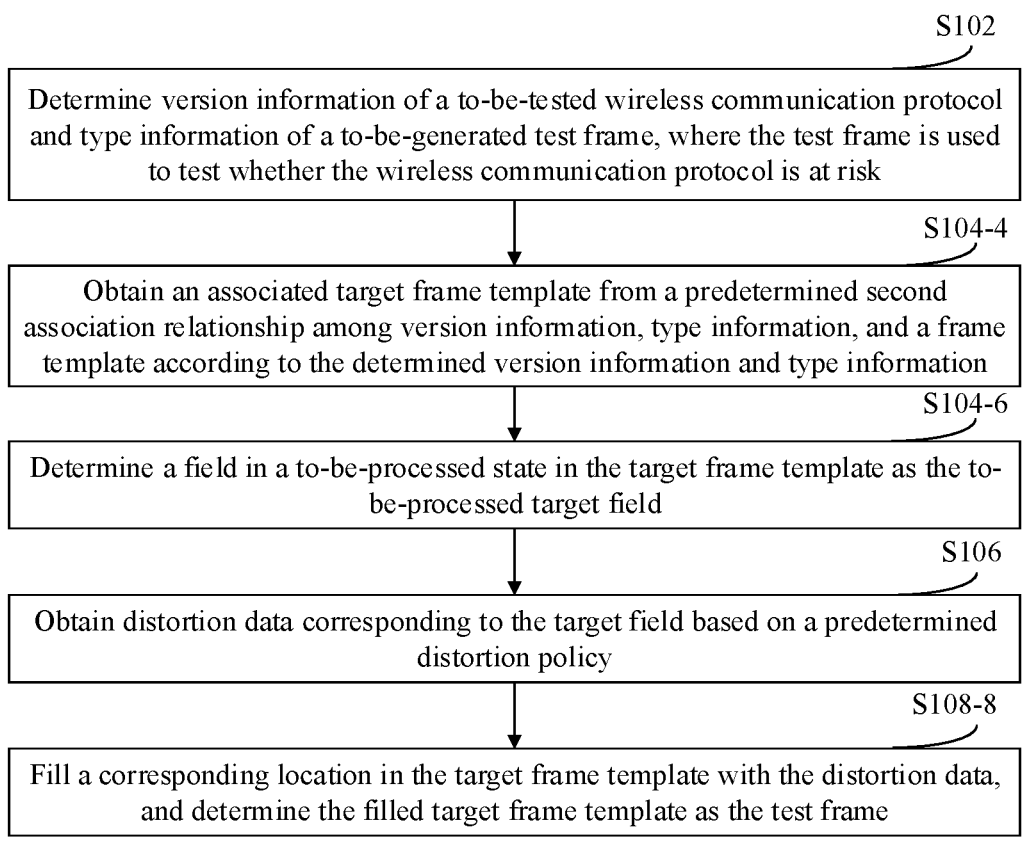
FIG. 3 is a third schematic flowchart illustrating a test frame generation method, according to one or more embodiments of this specification.

To increase a test frame generation rate, in one or more embodiments of this application, a second association relationship among version information, type information, and a frame template can be predetermined, and the target field is determined based on the second association relationship. Specifically, as shown in FIG. 3, step S104 can include the following steps S104-4 and S104-6. Step S104-4: Obtain an associated target frame template from a predetermined second association relationship among version information, type information, and a frame template according to the determined version information and type information. The target frame template complies with the frame format stipulated in the to-be-tested wireless communication protocol, that is, the target frame template includes each field constituting the test frame, and a location relationship between the fields complies with the frame format stipulated in the wireless communication protocol. For a field with fixed data, a corresponding field location is the fixed data.

Step S104-6: Determine a field in a to-be-processed state in the target frame template as the to-be-processed target field.

Corresponding to step S104-4 and step S104-6, step S108 can include the following step S108-8: Step S108-8: Fill a corresponding location in the target frame template with the distortion data, and determine the filled target frame template as the test frame.

Therefore, by presetting the previous second association relationship, the target frame template is determined based on the second association relationship, and the test frame is generated based on the target frame template. The frame template complies with the frame format stipulated in the wireless communication protocol, and the field with fixed data is pre-filled. Therefore, the test frame generation rate can be increased while test frame generation accuracy is ensured.

Figure 4:
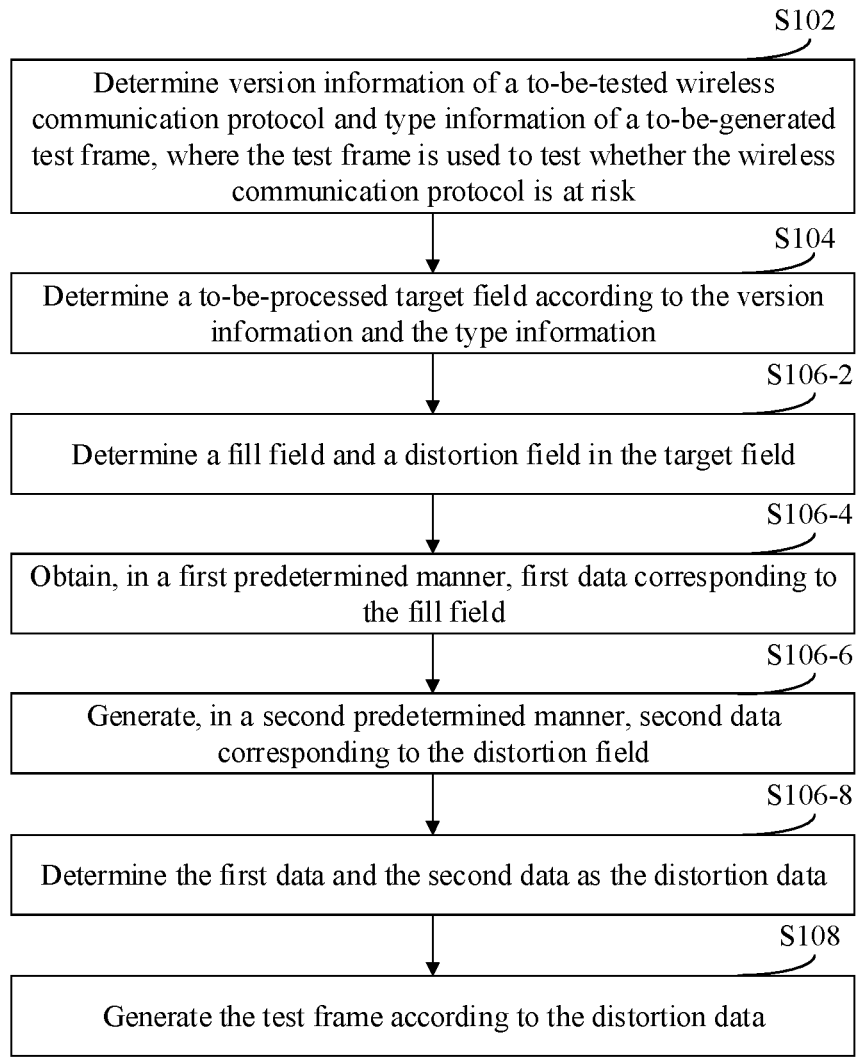
FIG. 4 is a fourth schematic flowchart illustrating a test frame generation method, according to one or more embodiments of this specification.

To satisfy a test requirement of the user for the wireless communication protocol, generally, the user specifies or presets some field data for the test frame generation apparatus to fill a corresponding field when the test frame is generated. At the same time, the test frame generation apparatus generates field data corresponding to a field other than the previous field in the target field. For ease of differentiation, in this embodiment of this application, a field that needs to be filled by the test frame generation apparatus according to field data specified or predetermined by the user is referred to as a fill field, and a field for which the test frame generation apparatus needs to generate corresponding field data is referred to as a distortion field. Correspondingly, as shown in FIG. 4, step S106 can include the following steps S106-2 to S106-8: Step S106-2: Determine a fill field and a distortion field in the target field. Specifically, a field corresponding to field data included in the received test frame generation request and/or predetermined field data is determined as a fill field, and a field other than the fill field in the target field is determined as a distortion field. When the type of the test frame is a management frame, the fill field can include some fields in the frame head, a fixed field of the frame body, and some fields in the information element, and the distortion field can include the fixed field of the frame body and some fields in the information element. When the type of the test frame is a data frame, the fill field can include some fields in the frame head and some data fields in the frame body, and the distortion field can include some data fields in the frame body. When the type of the test frame is a control frame, the fill field can include some fields in the frame head, and the distortion field can include a field concatenated after the frame head. It is worthwhile to note that, to ensure that in a test process, the test frame can be effectively received by a tested device, the distortion field does not include a field in the frame head. Certainly, if there is a corresponding test requirement, the distortion field can also include a field in the frame head. This can be set according to a requirement in an actual application.

As an example, when the type of the test frame is a management frame, the fill field can include fields such as Address1, Address2, and Address3 of the frame head, and fields such as Beacon interval, Service Set Identity, and DS Parameter Set of the frame body. The distortion field can include information element fields such as Supported Rates and FH Parameter Set of the frame body.

Step S106-4: Obtain, in a first predetermined manner, first data corresponding to the fill field. Specifically, the test frame generation request is received, and the first data are obtained from the test frame generation request; and/or predetermined first data are obtained from a specified location.

Step S106-6: Generate, in a second predetermined manner, second data corresponding to the distortion field. Specifically, when the determined type information represents that the test frame is a management frame, the distortion field includes multiple information elements, and the information element includes an element identifier field, a length field, and a content field. Correspondingly, step S106-6 can include the following step S106-62 to step S106-66: Step S106-62: Determine, according to a format stipulation of the information element in the wireless communication protocol, length data corresponding to the length field based on a predetermined first mutation policy. Step S106-64: Randomly generate content data corresponding to the content field according to the length data, and determine the length data and the content data as second data.

Specifically, if it is determined that a difference between a first predetermined length and a total length of fields of a current to-be-generated test frame does not exceed a length threshold, and a quantity of information elements processed based on the first mutation policy does not exceed a predetermined quantity, one target information element is randomly selected from currently unprocessed information elements; and a target mutation policy that matches the target information element is determined from multiple predetermined first mutation policies, and length data corresponding to the length field of the target information element is determined based on the target mutation policy. The content data corresponding to the content field are randomly generated according to the determined length data, and the length data and the content data are determined as the second data.

More specifically, after the distortion field in the target field is determined, each information element in the distortion field is determined as a currently unprocessed information element, one target information element is randomly selected from the currently unprocessed information elements, a target mutation policy that matches the target information element in the multiple predetermined first mutation policies is determined, length data corresponding to a length field of the target information element is determined based on the target mutation policy, and content data corresponding to a content field is randomly generated according to the determined length data. In this case, distortion processing of the first information element is completed. A total length of fields of a current to-be-generated test frame is determined, whether a difference between a first predetermined length and the total length exceeds a predetermined length threshold is determined, and if yes, the obtained length data and content data are determined as the second data; or if no, it is determined whether a quantity of information elements processed based on a first mutation policy does not exceed a predetermined quantity; and if yes, the obtained length data and content data are determined as the second data; or if no, a target information element is randomly selected from currently unprocessed information elements, and the target information element is processed in the previous manner. The first predetermined length can be a maximum length of a management frame stipulated in the wireless communication protocol. When it is determined that the difference between the first predetermined length and the total length of the fields of the current to-be-generated test frame exceeds the predetermined length threshold, it indicates that the total length is close to the maximum length, and the length difference between the total length and the maximum length is not enough to add an information element. Both the length threshold and the predetermined quantity can be set according to a requirement in an actual application. It is worthwhile to note that when the length data is zero, there is no content data.

Further, in consideration that in an actual application, the wireless communication protocol stipulates that there is an association relationship between some information elements, for example, the information elements must occur at the same time. To comply with the stipulation of the protocol, in one or more embodiments of this application, the randomly selecting a target information element from currently unprocessed information elements can include: randomly selecting one information element from the currently unprocessed information elements as a candidate information element; determining whether an association information element associated with the candidate information element exists in the currently unprocessed information elements; and if the association information element exists, and it is deduced that a difference between the first predetermined length and a total length of the candidate information element and the association information element that are processed based on the first mutation policy and the fields of the currently to-be-generated test frame does not exceed the length threshold, and a total quantity of information elements processed based on the first mutation policy and the candidate information element and the association information element does not exceed the predetermined quantity, determining the candidate information element as a target information element, and determining the association information element as a next target information element; or if the association information element does not exist, determining the candidate information element as a target information element.

By determining whether the association information element exists, and performing length deduction when the association information element exists, it can be ensured that the generated test frame complies with related stipulations of the wireless communication protocol, so in a test process of wireless communication, it can be ensured that the test frame can be successfully received by a tested device, and is not determined as an invalid frame and discarded by the tested device, thereby ensuring an effective test of the wireless communication protocol.

Further, to avoid a subsequent blind test of the wireless communication protocol, the previous first mutation policy includes any one or more of the following: determining a sum of a length of an information element stipulated in the wireless communication protocol and a second predetermined length as the length data corresponding to the length field; determining a difference between a length of an information element stipulated in the wireless communication protocol and a third predetermined length as the length data corresponding to the length field; determining a minimum length in a length range of an information element stipulated in the wireless communication protocol as the length data corresponding to the length field; determining a maximum length in a length range of an information element stipulated in the wireless communication protocol as the length data corresponding to the length field; determining any length in a length range of an information element stipulated in the wireless communication protocol as the length data corresponding to the length field; determining a sum of a minimum length in a length range of an information element stipulated in the wireless communication protocol and a fourth predetermined length as the length data corresponding to the length field; determining a difference between a maximum length in a length range of an information element stipulated in the wireless communication protocol and a fifth predetermined length as the length data corresponding to the length field; determining zero as the length data corresponding to the length field; and determining specified data as the length data corresponding to the length field.

The second predetermined length to the fifth predetermined length can be the same or can be different. For example, the second predetermined length to the fifth predetermined length are the same and are all 1. By presetting the previous first distortion policy, an information element whose length field and content field are distorted can be generated, so a targeted test can be performed, by using the distorted information element, on whether a security vulnerability exists in parsing different information elements in implementation of the wireless communication protocol.

Further, the determining a target mutation policy that matches the target information element in multiple predetermined first mutation policies can include: determining a length stipulation in the to-be-tested wireless communication protocol for the target information element, and if the stipulation is a length range, randomly selecting one mutation policy from first mutation policies related to the length range, and determining the mutation policy as the target mutation policy; or if the stipulation is a fixed length, one mutation policy can be randomly selected from first mutation policies other than the first mutation policy related to the length range, and determined as the target mutation policy.

As an example, a generated management frame is 50 00 3a 01 80 7d 3a 84 35 f8 04 d9 f5 26 ff c0 04 d9 f5 26 ff c0 f0 5f 00 20 49 05 00 00 00 00 64 00 f1 ff 00 0a 77 66 5f 74 65 73 74 69 6e 67 01 08 82 84 8b 96 12 24 48 6c 00 01 0b 05 04 00 01 00 18 29 00, where 29 00 is an information element after distortion processing, 29 is element identifier information, 00 is length data, and because a length is 0, there is no content data.

Further, to ensure comprehensiveness of a subsequent test, in one or more embodiments of this application, mutation processing can be further performed on the overall information element. Specifically, the method can further include: performing overall mutation processing on the information element according to a predetermined second mutation policy, where the second mutation policy includes one or more of copying the information element and deleting an indispensable information element.

For a distortion field in a fixed field of the management frame, data that comply with a format stipulated in the wireless communication protocol can be randomly generated.

The previous is a process of generating the second data of the distortion field based on the mutation policy when the type of the test frame is a management frame, so as to ensure that the generated second data comply with the stipulation of the wireless communication protocol. In addition, the test frame generated based on the second data can be used to perform a targeted and effective test on the to-be-tested wireless communication protocol.

Further, when the determined type information represents that the test frame is a data frame, step S106-6 can include the following step S106-66: Step S106-66: Randomly generate second data corresponding to the distortion field, or randomly generate, according to a format stipulation of the distortion field in the wireless communication protocol, second data that comply with the format stipulation, where a length of the test frame generated based on the second data does not exceed a second predetermined length.

Specifically, it is determined whether there is a format stipulation of the distortion field in the to-be-tested wireless communication protocol; if not, the second data corresponding to the distortion field are randomly generated, and it is ensured that a total length of the second data and fields of a current to-be-generated test frame does not exceed the second predetermined length; or if yes, the second data that comply with the format stipulation are randomly generated according to the format stipulation, and it is ensured that the total length of the second data and the fields of the current to-be-generated test frame does not exceed the second predetermined length. For example, for a data frame in an authentication scenario, the wireless communication protocol has a format stipulation for key data in the data frame, and corresponding key data can be randomly generated according to the format stipulation. The second predetermined length can be a maximum length of a data frame stipulated in the to-be-tested wireless communication protocol.

Further, when the determined type information represents that the test frame is a control frame, step S106-6 can include the following step S106-68: Step S106-68: Randomly generate second data corresponding to the distortion field, where a length of a test frame generated based on the second data does not exceed a third predetermined length.

Because the control frame has only a frame head, a distortion field can be added behind the frame head, and second data corresponding to the distortion field can be randomly generated.

Step S106-8: Determine the first data and the second data as the distortion data.

According to different formats of test frames of different types, corresponding distortion policies are used to implement related processing of corresponding distortion data, that is, effective generation of test frames is implemented.

Figure 5:
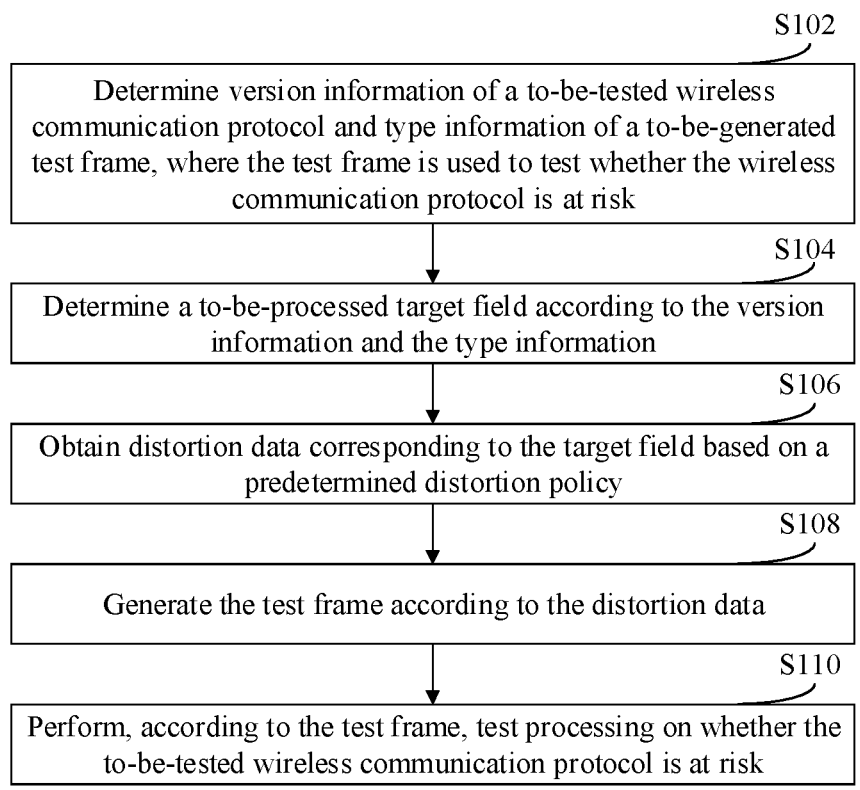
FIG. 5 is a fifth schematic flowchart illustrating a test frame generation method, according to one or more embodiments of this specification.

After the test frame is generated, test processing can be performed on the to-be-tested wireless communication protocol based on the test frame. Specifically, as shown in FIG. 5, after step S108, the method can further include the following step S110: Step S110: Perform, according to the test frame, test processing on whether the wireless communication protocol is at risk.

Specifically, the test frame is sent to a tested device that performs data communication based on the to-be-tested wireless communication protocol; and a parsing log of the tested device for the test frame is obtained, and whether the wireless communication protocol is at risk is determined according to the parsing log. Determining, according to the parsing log, whether the wireless communication protocol is at risk can include: determining whether the tested device performs parsing processing on the second data corresponding to the distortion field; and if yes, determining that the to-be-tested wireless communication protocol is not at risk; or if no, determining that the to-be-tested wireless communication protocol is at risk. The tested device does not parse the distortion field, but directly uses it as a correct field. When it is considered that data are valid, an attacker can use the vulnerability to implant virus or Trojan horse, so as to attack the device. Therefore, when it is determined that the tested device does not parse the second data corresponding to the distortion field, it is determined that the to-be-tested wireless communication protocol is at risk. Thus, a security test of the wireless communication protocol can be implemented.

In one or more embodiments of this application, the to-be-processed target field is determined according to the version information of the to-be-tested wireless communication protocol and the type information of the to-be-generated test frame; the distortion data corresponding to the target field is obtained based on the predetermined distortion policy; and the test frame is generated according to the distortion data. Therefore, in consideration of both a version of a wireless communication protocol and a type of a frame, a test frame is generated based on a distortion policy, so the generated test frame is effective and more targeted, so accuracy of a test result of the to-be-tested wireless communication protocol can be improved, and a security vulnerability existing in the wireless communication protocol is discovered and patched in a timely manner, thereby avoiding a loss to the user.

Figure 6:
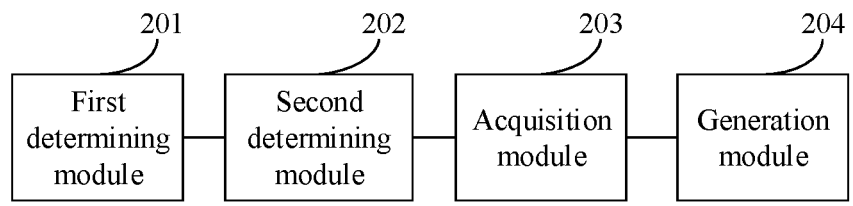
FIG. 6 is a schematic modular composition diagram illustrating a test frame generation apparatus, according to one or more embodiments of this specification.

Corresponding to the test frame generation method described above, based on the same technical concept, one or more embodiments of this specification further provide a test frame generation apparatus. FIG. 6 is a schematic modular composition diagram illustrating a test frame generation apparatus, according to one or more embodiments of this specification. As shown in FIG. 6, the apparatus includes: a first determining module 201, configured to determine version information of a to-be-tested wireless communication protocol and type information of a to-be-generated test frame, where the test frame is used to test whether the wireless communication protocol is at risk; a second determining module 202, configured to determine a to-be-processed target field according to the version information and the type information; an acquisition module 203, configured to obtain distortion data corresponding to the target field based on a predetermined distortion policy; and a generation module 204, configured to generate the test frame according to the distortion data.

In one or more embodiments of this specification, the test frame generation apparatus determines the to-be-processed target field according to the version information of the to-be-tested wireless communication protocol and the type information of the to-be-generated test frame; obtains the distortion data corresponding to the target field based on the predetermined distortion policy; and generates the test frame according to the distortion data. Therefore, in consideration of both a version of a wireless communication protocol and a type of a frame, a test frame is generated based on a distortion policy, so the generated test frame is effective and more targeted, so accuracy of a test result of the to-be-tested wireless communication protocol can be improved, and a security vulnerability existing in the wireless communication protocol is discovered and patched in a timely manner, thereby avoiding a loss to the user.

Optionally, the acquisition module 203 determines a fill field and a distortion field in the target field; obtains, in a first predetermined manner, first data corresponding to the fill field; generates, in a second predetermined manner, second data corresponding to the distortion field; and determines the first data and the second data as the distortion data.

Optionally, the type information represents that the test frame is a management frame, the distortion field includes multiple information elements, and the information element includes a length field and a content field. Correspondingly, the acquisition module 203 determines, according to a format stipulation of the information element in the wireless communication protocol, length data corresponding to the length field based on a predetermined first mutation policy; randomly generates content data corresponding to the content field according to the length data; and determines the length data and the content data as the second data.

Optionally, the type information represents that the test frame is a data frame. Correspondingly, the acquisition module 203 randomly generates the second data corresponding to the distortion field, where a length of the test frame generated based on the second data does not exceed a second predetermined length; or randomly generates, according to a format stipulation of the distortion field in the wireless communication protocol, second data that comply with the format stipulation, where a length of the test frame generated based on the second data does not exceed a second predetermined length.

Optionally, the type information represents that the test frame is a control frame. Correspondingly, the acquisition module 203 randomly generates the second data corresponding to the distortion field, where a length of the test frame generated based on the second data does not exceed a third predetermined length.

Optionally, the apparatus further includes a test module, where the test module performs, according to the test frame, test processing on whether the wireless communication protocol is at risk.

Optionally, the test module sends the test frame to a tested device that performs data communication based on the wireless communication protocol; obtains a parsing log of the tested device for the test frame; and determines whether the wireless communication protocol is at risk according to the parsing log.

In one or more embodiments of this specification, the test frame generation apparatus determines the to-be-processed target field according to the version information of the to-be-tested wireless communication protocol and the type information of the to-be-generated test frame; obtains the distortion data corresponding to the target field based on the predetermined distortion policy; and generates the test frame according to the distortion data. Therefore, in consideration of both a version of a wireless communication protocol and a type of a frame, a test frame is generated based on a distortion policy, so the generated test frame is effective and more targeted, so accuracy of a test result of the to-be-tested wireless communication protocol can be improved, and a security vulnerability existing in the wireless communication protocol is discovered and patched in a timely manner, thereby avoiding a loss to the user.

It is worthwhile to note that embodiments of the test frame generation apparatus in this specification and embodiments of the test frame generation method in this specification are based on the same inventive concept. Therefore, for specific implementation of this embodiment, reference can be made to an embodiment of the previous test frame generation method. Details are not described again.

Figure 7:
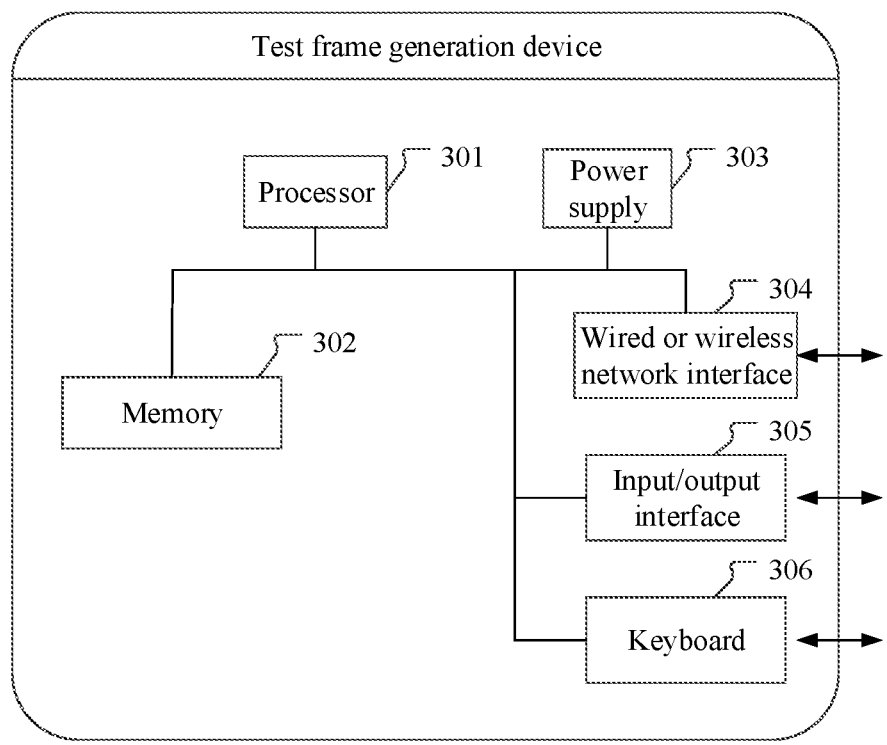
FIG. 7 is a schematic structural diagram illustrating a test frame generation device, according to one or more embodiments of this specification.

Further, corresponding to the previous test frame generation method, based on the same technical concept, one or more embodiments of this specification further provide a test frame generation device. The device is configured to perform the test frame generation method. FIG. 7 is a schematic structural diagram illustrating a test frame generation device, according to one or more embodiments of this specification.

As shown in FIG. 7, the test frame generation device can vary greatly based on configuration or performance, and can include one or more processors 301 and a memory 302. The memory 302 can store one or more storage applications or data. The memory 302 can be used for transient storage or persistent storage. The applications stored in the memory 302 can include one or more modules (not shown in the figure), and each module can include a series of computer executable instructions for the test frame generation device. Further, the processor 301 can be configured to communicate with the memory 302, and execute a series of computer executable instructions in the memory 302 on the test frame generation device. The test frame generation device can further include one or more power supplies 303, one or more wired or wireless network interfaces 304, one or more input/output interfaces 305, and one or more keyboards 306.

In a specific embodiment, the test frame generation device includes a memory and one or more programs. The one or more programs are stored in the memory. The one or more programs can include one or more modules. Each module can include a series of computer executable instructions for the test frame generation device. The one or more processors are configured to execute the following computer executable instructions included in the one or more programs: determining version information of a to-be-tested wireless communication protocol and type information of a to-be-generated test frame, where the test frame is used to test whether the wireless communication protocol is at risk; determining a to-be-processed target field according to the version information and the type information; obtaining distortion data corresponding to the target field based on a predetermined distortion policy; and generating the test frame according to the distortion data.

Optionally, when the computer executable instructions are executed, the obtaining distortion data corresponding to the target field based on a predetermined distortion policy includes: determining a fill field and a distortion field in the target field; obtaining, in a first predetermined manner, first data corresponding to the fill field; generating, in a second predetermined manner, second data corresponding to the distortion field; and determining the first data and the second data as the distortion data.

Optionally, when the computer executable instructions are executed, the type information represents that the test frame is a management frame, the distortion field includes multiple information elements, and the information element includes a length field and a content field. The generating, in a second predetermined manner, second data corresponding to the distortion field includes: determining, according to a format stipulation of the information element in the wireless communication protocol, length data corresponding to the length field based on a predetermined first mutation policy; randomly generating content data corresponding to the content field according to the length data; and determining the length data and the content data as the second data.

Optionally, when the computer executable instructions are executed, the type information represents that the test frame is a data frame, and the generating, in a second predetermined manner, second data corresponding to the distortion field includes: randomly generating the second data corresponding to the distortion field, where a length of the test frame generated based on the second data does not exceed a second predetermined length; or randomly generating, according to a format stipulation of the distortion field in the wireless communication protocol, second data that comply with the format stipulation, where a length of the test frame generated based on the second data does not exceed a second predetermined length.

Optionally, when the computer executable instructions are executed, the type information represents that the test frame is a control frame, and the generating, in a second predetermined manner, second data corresponding to the distortion field includes: randomly generating the second data corresponding to the distortion field, where a length of the test frame generated based on the second data does not exceed a third predetermined length.

Optionally, when the computer executable instructions are executed, after the generating the test frame according to the distortion data, it further includes: performing, according to the test frame, test processing on whether the wireless communication protocol is at risk.

In one or more embodiments of this specification, the test frame generation device determines the to-be-processed target field according to the version information of the to-be-tested wireless communication protocol and the type information of the to-be-generated test frame; obtains the distortion data corresponding to the target field based on the predetermined distortion policy; and generates the test frame according to the distortion data. Therefore, in consideration of both a version of a wireless communication protocol and a type of a frame, a test frame is generated based on a distortion policy, so the generated test frame is effective and more targeted, so accuracy of a test result of the to-be-tested wireless communication protocol can be improved, and a security vulnerability existing in the wireless communication protocol is discovered and patched in a timely manner, thereby avoiding a loss to the user.

It is worthwhile to note that embodiments of the test frame generation device in this specification and embodiments of the test frame generation method in this specification are based on the same inventive concept. Therefore, for specific implementation of this embodiment, reference can be made to an embodiment of the previous test frame generation method. Details are not described again.

Further, corresponding to the previous test frame generation method, based on the same technical concept, one or more embodiments of this specification further provide a storage medium, configured to store computer executable instructions. In specific embodiments, the storage medium can be a USB flash drive, an optical disc, a hard disk, etc. When being executed by a processor, the computer executable instructions stored in the storage medium can implement the following procedure: determining version information of a to-be-tested wireless communication protocol and type information of a to-be-generated test frame, where the test frame is used to test whether the wireless communication protocol is at risk; determining a to-be-processed target field according to the version information and the type information; obtaining distortion data corresponding to the target field based on a predetermined distortion policy; and generating the test frame according to the distortion data.

Optionally, when the computer executable instructions stored in the storage medium are executed by a processor, the obtaining distortion data corresponding to the target field based on a predetermined distortion policy includes: determining a fill field and a distortion field in the target field; obtaining, in a first predetermined manner, first data corresponding to the fill field; generating, in a second predetermined manner, second data corresponding to the distortion field; and determining the first data and the second data as the distortion data.

Optionally, when the computer executable instructions stored in the storage medium are executed by a processor, the type information represents that the test frame is a management frame, the distortion field includes multiple information elements, and the information element includes a length field and a content field. The generating, in a second predetermined manner, second data corresponding to the distortion field includes: determining, according to a format stipulation of the information element in the wireless communication protocol, length data corresponding to the length field based on a predetermined first mutation policy; randomly generating content data corresponding to the content field according to the length data; and determining the length data and the content data as the second data.

Optionally, when the computer executable instructions stored in the storage medium are executed by a processor, the type information represents that the test frame is a data frame, and the generating, in a second predetermined manner, second data corresponding to the distortion field includes: randomly generating the second data corresponding to the distortion field, where a length of the test frame generated based on the second data does not exceed a second predetermined length; or randomly generating, according to a format stipulation of the distortion field in the wireless communication protocol, second data that comply with the format stipulation, where a length of the test frame generated based on the second data does not exceed a second predetermined length.

Optionally, when the computer executable instructions stored in the storage medium are executed by a processor, the type information represents that the test frame is a control frame, and the generating, in a second predetermined manner, second data corresponding to the distortion field includes: randomly generating the second data corresponding to the distortion field, where a length of the test frame generated based on the second data does not exceed a third predetermined length.

Optionally, when the computer executable instructions stored in the storage medium are executed by a processor, after the generating the test frame according to the distortion data, the method further includes: performing, according to the test frame, test processing on whether the wireless communication protocol is at risk.

Optionally, when the computer executable instructions stored in the storage medium are executed by a processor, the performing, according to the test frame, test processing on whether the wireless communication protocol is at risk includes: sending the test frame to a tested device that performs data communication based on the wireless communication protocol; obtaining a parsing log of the tested device for the test frame; and determining whether the wireless communication protocol is at risk according to the parsing log.

In one or more embodiments of this specification, when the computer executable instructions stored in the storage medium are executed by the processor, the to-be-processed target field is determined according to the version information of the to-be-tested wireless communication protocol and the type information of the to-be-generated test frame; the distortion data corresponding to the target field is obtained based on the predetermined distortion policy; and the test frame is generated according to the distortion data. Therefore, in consideration of both a version of a wireless communication protocol and a type of a frame, a test frame is generated based on a distortion policy, so the generated test frame is effective and more targeted, so accuracy of a test result of the to-be-tested wireless communication protocol can be improved, and a security vulnerability existing in the wireless communication protocol is discovered and patched in a timely manner, thereby avoiding a loss to the user.

It is worthwhile to note that embodiments of the storage medium in this specification and embodiments of the test frame generation method in this specification are based on the same inventive concept. Therefore, for specific implementation of this embodiment, reference can be made to an embodiment of the previous test frame generation method. Details are not described again.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit (ASIC) chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any combination of these devices.

For ease of description, the apparatus above is described by dividing functions into various units. Certainly, when the embodiments of this specification are implemented, a function of each unit can be implemented in one or more pieces of software and/or hardware.

A person skilled in the art should understand that one or more embodiments of this application can be provided as a method, a system, or a computer program product. Therefore, the one or more embodiments of this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

This specification is described with reference to the flowcharts and/or block diagrams of the method, the device (system), and the computer program product based on the embodiments of this specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In typical configuration, the computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in this application, the computer readable medium does not include computer readable transitory media such as a modulated data signal and a carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The one or more embodiments of this specification can be described in common contexts of computer executable instructions executed by a computer, such as a program module. Generally, the program module includes a routine, a program, an object, a component, a data structure, etc. executing a specific task or implementing a specific abstract data type. The one or more embodiments of this specification can also be practiced in distributed computing environments. In the distributed computing environments, tasks are performed by remote processing devices that are connected through a communication network. In a distributed computing environment, the program module can be located in both local and remote computer storage media including storage devices.

The embodiments in this specification are described in a progressive way. For the same or similar parts of the embodiments, references can be made to the embodiments. Each embodiment focuses on a difference from other embodiments. Particularly, a system embodiment is similar to a method embodiment, and therefore is described briefly. For related parts, references can be made to related descriptions in the method embodiment.

The previous description is merely embodiments of this specification, and is not intended to limit this specification. A person skilled in the art can make various modifications and changes to this specification. Any modification, equivalent replacement, or improvement made without departing from the spirit and principle of this specification shall fall within the scope of the claims of this specification.

What is claimed is:

1. A test frame generation method, comprising:
   determining version information of a to-be-tested wireless communication protocol and type information of a to-be-generated test frame, wherein the test frame is used to test whether the wireless communication protocol is at risk;
   determining a to-be-processed target field according to the version information and the type information;
   obtaining distortion data corresponding to the target field based on a predetermined distortion policy; and
   generating the test frame according to the distortion data.

2. The method according to claim 1, wherein the determining a to-be-processed target field according to the version information and the type information comprises:
   obtaining an associated field from a predetermined first association relationship among version information, type information, and a field according to the version information and the type information, and determining the obtained field as the to-be-processed target field.

3. The method according to claim 2, wherein the generating the test frame according to the distortion data comprises:
   determining whether each field constituting the test frame comprises a field with fixed data; and
   if yes, performing concatenation processing on the fixed data and the distortion data according to a frame format stipulated in the wireless communication protocol, to obtain the test frame; or
   if no, performing concatenation processing on the distortion data according to a frame format stipulated in the wireless communication protocol to obtain the test frame.

4. The method according to claim 1, wherein the determining a to-be-processed target field according to the version information and the type information comprises:
   obtaining an associated target frame template from a predetermined second association relationship among version information, type information, and a frame template according to the version information and the type information, wherein the target frame template complies with a frame format stipulated in the wireless communication protocol; and determining a field in a to-be-processed state in the target frame template as the to-be-processed target field.

5. The method according to claim 4, wherein the generating the test frame according to the distortion data comprises:

filling a corresponding location in the target frame template with the distortion data, and determining the filled target frame template as the test frame.

6. The method according to claim 1, wherein the obtaining distortion data corresponding to the target field based on a predetermined distortion policy comprises:

determining a fill field and a distortion field in the target field;

obtaining, in a first predetermined manner, first data corresponding to the fill field;

generating, in a second predetermined manner, second data corresponding to the distortion field; and determining the first data and the second data as the distortion data.

7. The method according to claim 6, wherein the obtaining, in a first predetermined manner, first data corresponding to the fill field comprises:

receiving a test frame generation request, and obtaining the first data from the test frame generation request; and/or obtaining predetermined first data from a specified location.

8. The method according to claim 6, wherein the type information represents that the test frame is a management frame, the distortion field comprises multiple information elements, and the information element comprises a length field and a content field; and the generating, in a second predetermined manner, second data corresponding to the distortion field comprises:

determining, according to a format stipulation of the information element in the wireless communication protocol, length data corresponding to the length field based on a predetermined first mutation policy;

randomly generating content data corresponding to the content field according to the length data; and determining the length data and the content data as the second data.

9. The method according to claim 8, wherein the determining length data corresponding to the length field based on a predetermined first mutation policy comprises:

if it is determined that a difference between a first predetermined length and a total length of fields of a current to-be-generated test frame does not exceed a length threshold, and a quantity of information elements processed based on the first mutation policy does not exceed a predetermined quantity, randomly selecting one target information element from currently unprocessed information elements; and determining a target mutation policy that matches the target information element from multiple predetermined first mutation policies, and determining, based on the target mutation policy, length data corresponding to the length field of the target information element.

10. The method according to claim 9, wherein the randomly selecting one target information element from currently unprocessed information elements comprises:

randomly selecting one information element from the currently unprocessed information elements as a candidate information element;

determining whether an association information element associated with the candidate information element exists in the currently unprocessed information elements; and if the association information element exists, and it is deduced that a difference between the first predetermined length and a total length of the candidate information element and the association information element that are processed based on the first mutation policy and the fields of the currently to-be-generated test frame does not exceed the length threshold, and a total quantity of information elements processed based on the first mutation policy and the candidate information element and the association information element does not exceed the predetermined quantity, determining the candidate information element as a target information element, and determining the association information element as a next target information element; or if the association information element does not exist, determining the candidate information element as a target information element.

11. The method according to claim 8, wherein the first mutation policy comprises any one or more of the following:

determining a sum of a length of an information element stipulated in the wireless communication protocol and a second predetermined length as the length data corresponding to the length field;

determining a difference between a length of an information element stipulated in the wireless communication protocol and a third predetermined length as the length data corresponding to the length field;

determining a minimum length in a length range of an information element stipulated in the wireless communication protocol as the length data corresponding to the length field;

determining a maximum length in a length range of an information element stipulated in the wireless communication protocol as the length data corresponding to the length field;

determining any length in a length range of an information element stipulated in the wireless communication protocol as the length data corresponding to the length field;

determining a sum of a minimum length in a length range of an information element stipulated in the wireless communication protocol and a fourth predetermined length as the length data corresponding to the length field;

determining a difference between a maximum length in a length range of an information element stipulated in the wireless communication protocol and a fifth predetermined length as the length data corresponding to the length field;

determining zero as the length data corresponding to the length field; and determining specified data as the length data corresponding to the length field.

12. The method according to claim 8, wherein the method further comprises:

performing overall mutation processing on the information element according to a predetermined second mutation policy, wherein the second mutation policy comprises one or more of copying the information element and deleting an indispensable information element.

13. The method according to claim 6, wherein the type information represents that the test frame is a data frame, and the generating, in a second predetermined manner, second data corresponding to the distortion field comprises:
    randomly generating the second data corresponding to the distortion field, wherein a length of the test frame generated based on the second data does not exceed a second predetermined length; or
    randomly generating, according to a format stipulation of the distortion field in the wireless communication protocol, second data that comply with the format stipulation, wherein a length of the test frame generated based on the second data does not exceed a second predetermined length.

14. The method according to claim 6, wherein the type information represents that the test frame is a control frame, and the generating, in a second predetermined manner, second data corresponding to the distortion field comprises:
    randomly generating the second data corresponding to the distortion field, wherein a length of the test frame generated based on the second data does not exceed a third predetermined length.

15. The method according to claim 1, after the generating the test frame according to the distortion data, further comprising:
    performing, according to the test frame, test processing on whether the wireless communication protocol is at risk.

16. The method according to claim 15, wherein the performing, according to the test frame, test processing on whether the wireless communication protocol is at risk comprises:
    sending the test frame to a tested device that performs data communication based on the wireless communication protocol;
    obtaining a parsing log of the tested device for the test frame; and
    determining whether the wireless communication protocol is at risk according to the parsing log.

17. A device, comprising:
a processor; and
a memory, wherein the memory stores executable instructions that, in response to execution by the processor, cause the device to:
    determine version information of a to-be-tested wireless communication protocol and type information of a to-be-generated test frame, wherein the test frame is used to test whether the wireless communication protocol is at risk;
    determine a to-be-processed target field according to the version information and the type information;
    obtain distortion data corresponding to the target field based on a predetermined distortion policy; and
    generate the test frame according to the distortion data.

18. A non-transitory computer-readable storage medium having stored therein instructions that, when executed by a processor of a device, cause the device to:
    determine version information of a to-be-tested wireless communication protocol and type information of a to-be-generated test frame, wherein the test frame is used to test whether the wireless communication protocol is at risk;
    determine a to-be-processed target field according to the version information and the type information;
    obtain distortion data corresponding to the target field based on a predetermined distortion policy; and
    generate the test frame according to the distortion data.

* * * * *